United States Patent
Brown et al.

(10) Patent No.: US 9,444,279 B1
(45) Date of Patent: Sep. 13, 2016

(54) WIRELESS CHARGING IDENTIFICATION USING SENSORS

(71) Applicant: Google Inc., Mountain View, CA (US)

(72) Inventors: Jeff Brown, Mountain View, CA (US); Dave Burke, Mountain View, CA (US)

(73) Assignee: Google Inc., Mountain View, CA (US)

( * ) Notice: Subject to any disclaimer, the term of this patent is extended or adjusted under 35 U.S.C. 154(b) by 244 days.

(21) Appl. No.: 13/898,717

(22) Filed: May 21, 2013

(51) Int. Cl.
*H02J 7/00* (2006.01)
*H02J 7/02* (2016.01)

(52) U.S. Cl.
CPC ............ *H02J 7/0047* (2013.01); *H02J 7/0042* (2013.01); *H02J 7/025* (2013.01)

(58) Field of Classification Search
CPC ....................................................... H02J 7/025
USPC ....................................................... 320/108
See application file for complete search history.

(56) References Cited

U.S. PATENT DOCUMENTS

| | | | |
|---|---|---|---|
| 8,248,024 B2 | 8/2012 | Yuan | |
| 8,432,129 B2 | 4/2013 | Lee | |
| 2012/0161697 A1* | 6/2012 | Park | G06F 1/263 320/108 |
| 2012/0214462 A1 | 8/2012 | Chu | |
| 2012/0235636 A1* | 9/2012 | Partovi | H02J 7/025 320/108 |
| 2012/0246374 A1* | 9/2012 | Fino | G06F 1/1632 710/303 |
| 2013/0002191 A1 | 1/2013 | Jung | |
| 2013/0082651 A1 | 4/2013 | Park | |
| 2014/0129176 A1* | 5/2014 | Ramanandan | G01P 13/02 702/141 |

* cited by examiner

*Primary Examiner* — Richard Isla Rodas
*Assistant Examiner* — Dung V Bui
(74) *Attorney, Agent, or Firm* — McDonnell Boehnen Hulbert & Berghoff LLP

(57) ABSTRACT

Methods and systems for implementing wireless charging identification using a sensor are described. A device platform operating a device, such as a mobile electronic device, may be configured to determine that the device is in wireless communication with a charging surface by receiving and analyzing information from sensors. A battery or another entity associated with the device may receive a charge wirelessly from the charging surface through induction or another means. The device platform may determine if an orientation of the device relative to the charging surface has changed depending on the state of the charging process. In some examples, the device platform may use information from an accelerometer, gyroscope, or magnetometer to determine whether the device has moved. Based on whether the orientation of the device has changed relative to the charging surface, the device platform may be configured to provide feedback through one or more systems, such as audible notifications.

16 Claims, 5 Drawing Sheets

WIRELESS CHARGING IDENTIFICATION USING SENSORS

BACKGROUND

A battery is a device including one or more electrochemical cells that may convert stored chemical energy into electrical energy. Batteries may be used as the power source for many household and industrial applications, including providing power to mobile devices. Some types of batteries are capable of being recharged and used a number of times. When the battery of a mobile device is connected to a charger, electrical energy from the charger is converted into chemical energy that is stored in the battery. Mobile device chargers may use different types of chargers, such as chargers that extract power from a wall outlet or a car battery. Some chargers may use a wire connection to charge a mobile device. Other chargers may use induction charging to wirelessly transfer charge to the battery of a mobile device.

SUMMARY

The present application discloses example systems, devices, and methods that relate to a wireless charging dock identification using sensors. In one aspect, the present application describes a method. The method may comprise determining that a mobile electronic device is in wireless communication with a charging surface. The method may also comprise determining whether the mobile electronic device is receiving a charge during a first session via the charging surface. The method may further comprise determining whether an orientation of the mobile electronic device relative to the charging surface has changed since the mobile electronic device began receiving the charge during the first session. The method may comprise based on whether the mobile electronic device is receiving the charge during a second session subsequent to the first session and whether the orientation of the mobile electronic device relative to the charging surface has changed since the mobile electronic device began receiving the charge during the first session, providing feedback through one or more systems of the mobile electronic device.

In another aspect, the present application describes a non-transitory computer readable medium having stored thereon executable instructions that, upon execution by a computing device, cause the computing device to perform functions. The functions may comprise determining that the computing device is in wireless communication with a charging surface. The functions may also comprise determining whether the computing device is receiving a charge during a first session via the charging surface. The functions may further comprise determining whether an orientation of the computing device relative to the charging surface has changed since the computing device began receiving the charge during the first session. The functions may comprise based on whether the computing device is receiving the charge during a second session subsequent to the first session and whether the orientation of the device relative to the charging surface has changed since the computing device began receiving the charge during the first session, providing feedback through one or more systems of the computing device.

In still another aspect, the present application describes a computing device. The computing device may comprise at least one processor. The computing device also may comprise a memory having stored thereon executable instructions that, upon execution by the at least one processor, cause the computing device to perform functions comprising determining that the computing device is in wireless communication with a charging surface. The functions may also comprise determining whether the computing device is receiving a charge during a first session via the charging surface. The functions may further comprise determining whether an orientation of the computing device relative to the charging surface has changed since the computing device began receiving the charge during the first session. The functions may comprise based on whether the computing device is receiving the charge during a second session subsequent to the first session and whether the orientation of the computing device relative to the charging surface has changed since the computing device began receiving the charge during the first session, providing feedback through one or more systems of the computing device.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
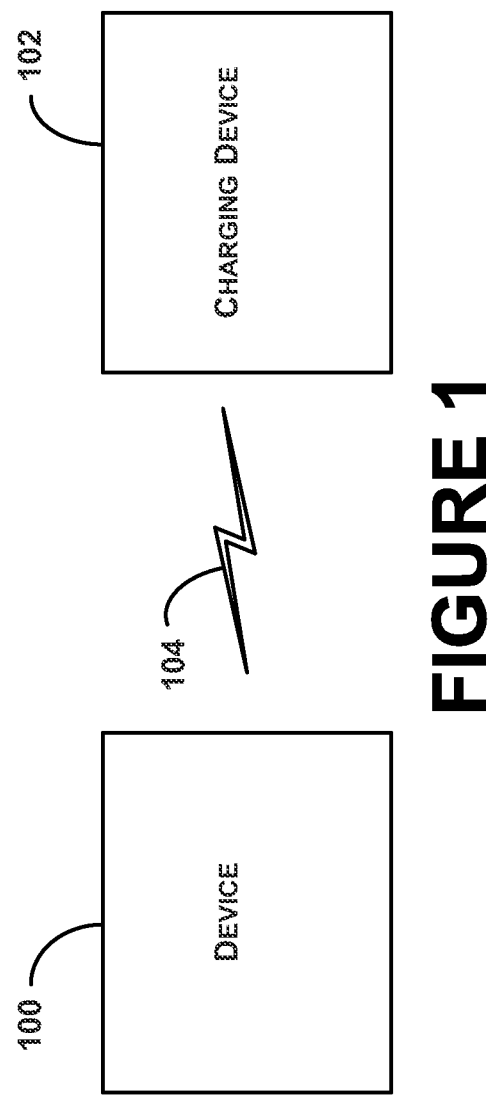
FIG. 1 is a simplified block diagram of an example system including a device and a charging device.

The following detailed description describes various features and functions of the disclosed systems, devices, and methods with reference to the accompanying figures. In the figures, similar symbols identify similar components, unless context dictates otherwise. The illustrative system and method embodiments described herein are not meant to be limiting. It may be readily understood that certain aspects of the disclosed systems, devices and methods can be arranged and combined in a wide variety of different configurations, all of which are contemplated herein.

A device platform configured to provide functions of a mobile electronic device or other entity may be configured to determine that the mobile electronic device is in wireless communication with a charging surface of a charging device using information received from one or more sensors. A battery or another entity associated with the device may receive charge from the charging surface of the charging device. A charging surface of a charging device may be a linear surface or a different structure. The battery may receive charge from the charging surface through induction charging or another means of receiving charge. The device platform may be configured to monitor the charging process or portions of the charging process. The device platform may be configured to also determine different charging sessions. Each charging session may be separated by a temporary halt of receiving charge by the device from the charging device.

In some implementations, the device platform may be configured to notify/alert the user through one or more systems of the device that the battery is properly receiving charge. For example, the device platform may play an audible alert through one or more speakers of the device after determining that the device is properly receiving charge. Similarly, the device platform may cause the device to vibrate or perform visual notifications in response to determining that the device is properly receiving charge.

The device platform operating the device may be configured to make a determination whether an orientation of the device relative to the charging surface has changed since the device began receiving charge during an initial or first session prior to providing notifications to the user. Further, the device platform may determine whether the orientation of the device has changed at some point between receiving a charge during a first session and receiving a charge during a second session subsequent to the first session. A device platform may use various techniques to determine if the orientation of the device has changed, which may include an adjustment by the user. For example, the device platform may determine and use a number of gravity vectors to determine if the device has changed orientation relative to the charging surface. The device platform may compare at least two gravity vectors to determine if the device has endured any movement during a charging session or during different charging sessions. The device platform may use additional other techniques, such as receiving information from an accelerometer, a gyroscope, a magnetometer sensor, or other measuring entities to detect if the device has changed orientation and/or been moved relative to the charging surface.

In some implementations, the device platform may be configured to provide feedback through one or more systems of the device depending on the whether the orientation of the device relative to the charging surface has changed and/or if the device has moved position. The device platform may be configured to keep the device in a state of rest in the case that the device has not moved or changed orientation. A device operating in a state of rest may be configured to not perform any audible alerts or other notifications to the user. For example, in a possible situation, the battery of the device may complete receiving a charge and thus, cease receiving a charge from the charging device. However, after a period of time, the battery of the device may have drained enough beyond a threshold amount that the battery starts to receive a charge again. Depending whether or not the orientation of the device relative to the charging surface has changed since the device began receiving the charge during the first session or a subsequent session, the device platform may be configured to either wake the device from the state of rest to perform audible and/or other types of alerts to inform that the device is now starting to charge again or the device platform may keep the device in the state of rest and refrain from performing one or more types of notifications. For example, the device platform may determine that the device has not changed position since the initial charge and the recharge started. In response, the device platform may keep the device in a state of rest since the device never was moved by a user, and the device can still begin to receive charge again. Other examples may exist as well.

I. Example System

Referring now to the Figures, FIG. 1 is a simplified block diagram of an example system including a device and a charging device. FIG. 1 depicts an example device 100, a charging device 102, and a charge 104 symbolically represented by a lightning bolt for illustration purposes.

Within the example, a device 100 may be receiving a charge 104 wirelessly from the charging device 102. In some instances, the device 100 may receive the charge 104 from the charging device 102 through a wired connection. Other examples may exist as well.

The device 100 may represent any type of device capable of receiving a charge. Example devices may include mobile electronic devices, computing devices, or other devices that may utilize electrical charge from one or more batteries. Similarly, in some systems, the device 100 may represent industrial devices, vehicles, or other entities capable of receiving a charge from the charging device 102. The device 100 may be configured with one or more components, which may include one or more batteries. The device 100 may use various types of batteries, which may include lithium polymer batteries, lithium ion batteries, nickel cadmium batteries, or nickel metal hydride batteries, for example. The batteries may be linked to power the device in a series, parallel, or hybrid connection.

The device 100 may include various entities or processors in control of operating the device 100. In some implementations, the device 100 may include a device platform, which may be configured as a multi-layered Linux platform or a similar platform entity. The device platform of the device 100 may include different kernels, libraries, application framework, applications, and various types of runtime entities. In other examples, other formats or systems may operate the device 100 as well.

The device 100, such as a mobile electronic device, may communicate with the charging device 102 through various means, which may include wireless or wired communications. In some instances, the device 100 and charging device 102 may be parts of the same network, which may be wired or wireless. For example, a device may communicate through physical connections, such as docking connectors that provide a presence detection signal of some kind. A device may also communicate through wireless connections to detect coupling. In one example implementation, a dock may be configured in a manner that two wires may be shorted together within the dock so that a device may reliably detect a physical coupling to a charging device.

Similarly, a device 100 may communicate with the charging device 102 through the use of Bluetooth, Near Field Communication (NFC), Qi wireless charging control signals, or other type of communication technology. The operating platform of the device 100 may also be configured to communicate with the charging device 102. The device platform operating the device 100 may be configured to receive and utilize information from sensors to determine if the device 100 is receiving charge from the charging device 102.

In some examples, the device 100 may be part of multiple devices receiving charge from the charging device 102. Multiple devices may receive charge from a charging device simultaneously or may receive charge in some type of order. The device 100 may be configured to receive a charge from the charging 102 during different sessions.

FIG. 1 depicts the charging device 102 within the example system. The charging device 102 may represent any type of device capable of providing a charge to the device 100. The charging device 102 may receive power wirelessly or through a wired connection. The charging device 102 may be configured to convert power received from a wall-socket or another source into a format that the device 100 is capable of receiving.

In the example illustration, the charging device 102 may provide a charge to the device 100 wirelessly as shown by charge 104. In some instances, the charging device 102 may provide the charge 104 through a wired connection. The charging device 102 may provide charge to one or more devices through induction or another means of transferring charge 104.

The charging device 102 may be configured in various formats or structures. In some instances, the charging device 102 may be a mat or similar flat structure. In other instances, the charging device 102 may be an orb or circular structure. Similarly, the charging device 102 may be configured in other structures. In addition, the charging device 102 may be compiled through various components. Different entities may act within a network or system to function as the charging device 102. The charging device 102 may include one or more charging surfaces capable of providing charge through to a device. The charging surfaces may be structured different in different charging devices. Other example charging devices may exist as well. The charging device 102 may be configured with sensors, timers, or other useful entities that may assist in the charging process.

FIG. 1 depicts a charge 104, which is represented by a lightning bolt for illustration purposes. The charge 104 may represent the transfer of power between the device 100 (e.g., mobile electronic device) and the charging device 104. The charge 104 may be transferred wirelessly or through different means, such as a wired connection.

II. Example Method

Figure 2:
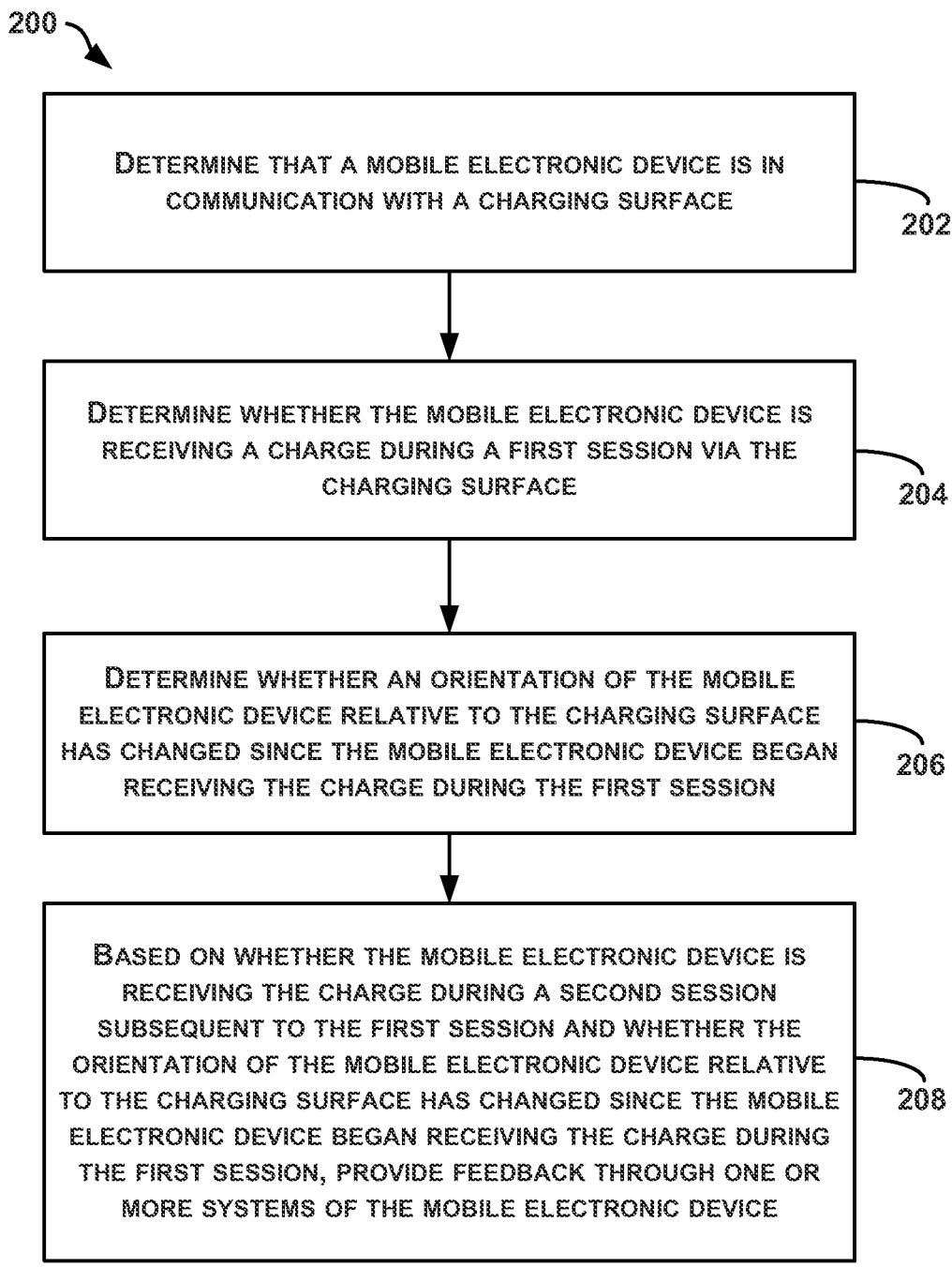
FIG. 2 is a flow chart of an example method for implementing a wireless charging dock identification using sensors.

FIG. 2 is a flow chart of a method 200 for implementing wireless charging dock identification using sensors. Other example methods for implementing wireless charging dock identification using sensors may exist as well.

The method 200 may include one or more operations, functions, or actions as illustrated by one or more of blocks 202-208. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

Furthermore, for the method 200 and other processes and methods disclosed herein, each block in FIG. 2 may represent circuitry that is wired to perform the specific logical functions in the process.

At block 202, the method 200 includes determining that a mobile electronic device is in wireless communication with a charging surface. A processor or another entity operating a mobile electronic device or similar device may be configured to determine that the mobile electronic device is in wireless or wired communication with a charging surface, such as a charging plane. Similarly, the device platform may be configured to determine if the mobile electronic device or other entity is in wireless or wired communication with the charging surface. A device in wireless communication with the charging surface may be resting on the charging surface, nearby, or associated with the charging surface in some other manner, for example. The device platform may receive information from one or more sensors that allow the device platform to determine if the device is connected or physically touching the charging surface of a charging device. The device platform may be configured to communicate with the charging device to determine if the device is couple to the charging surface. The device platform may be configured to determine that a particular part of the device (e.g., the battery) is touching or in close approximation to the charging surface of the charging surface. In some implementations, the method 200 may be performed using the format and devices discussed within FIG. 1. Other devices may be used as well.

Figure 3A:
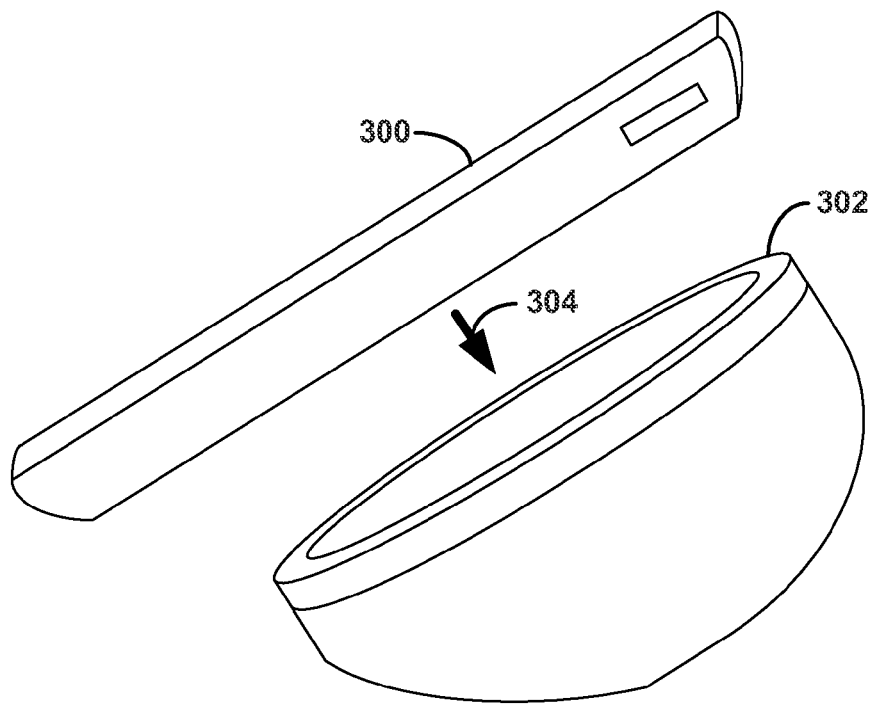
FIGS. 3A-3D illustrate an example implementation using a wireless charging dock identification using sensors.
Figure 3B:
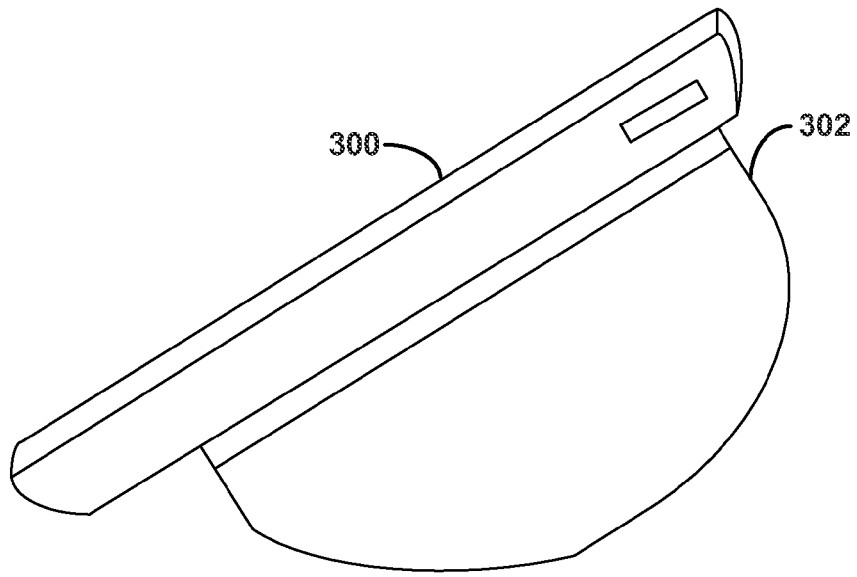

FIGS. 3A-3B further illustrate an example implementation of a device platform or another entity controlling a device and making a determination that the device is in wireless communication to a charging surface. FIG. 3A depicts a device 300 connecting to a charging device 302, which may be a mobile phone, computer tablet, or another type of device capable of receiving a charge from a charging device. Also illustrated within FIG. 3A is the charging device 302, which appears as a semi circularly device. In other examples, the charging device may take on a different structure or format.

FIG. 3A illustrates the placement of the device 300 onto the charging surface of the charging device 302. The device platform controlling the device 300 may be configured to determine that the device is in wireless or wired communication with the charging device. The example shown in FIG. 3A also includes an arrow 304, which represents the movement of the device 300 onto the charging surface of the charging device 302. The arrow 304 serves merely for illustration purposes. The device may be placed on the charging device in various ways and at different angles and/or orientations.

FIG. 3B illustrates the device 300 in wireless communication with the charging device 302. The example illustrated by FIG. 3B may be the result of the device 300 being placed on the charging device 302 as shown in FIG. 3A. One or more entities or processors associated with the operating platform of the device 300 may be configured to receive information from one or more sensors that may determine if the device 300 is coupled or at least in wireless communication with the charging surface of the charging device 302. Likewise, the device platform may be configured to receive information and determine whether the device 300 changes orientation or position while charging on charging device 302. In some instances, the device platform may be configured to determine to alert the user that the device 300 is not properly placed on the charging device 302.

In some examples, the device platform operating the device 300 may determine that the device 300 is not properly communicating or associating with the charging device 302. The device may be required to be resting on the charging device 302 or may be capable of being in close approximation to receive a charge, for example. The device platform may alert the user that a reposition is necessary in order to ensure that the device is position on the charging surface.

At block 204, the method 200 further determining whether the mobile electronic device is receiving a charge during a first session via the charging surface. A device platform may be configured to determine if a device is receiving a charge from the charging device through the charging surface. The device may be receiving the charge and storing the charge within a battery or multiple batteries. In some implementations, the device platform of the device may be configured to determine if the device is receiving a charge from the charging surface. The device platform may determine that the device is charging during a first session, which may be the initial charge received by the device. Similarly, the device platform may determine if the device is receiving charge during a subsequent session after completing the first session. The first session may exist until the battery completely fills or may be completed at a different point. The device platform may be configured to use one or more systems of the device to alert a user that the device is receiving a charge. The device may receive the charge via induction from the charging surface, for example.

In some instances, the device platform or another entity (e.g., a processor) associated with the device may be configured to determine if the device is properly receiving power from the charger. For example, a device platform may use information from one or more sensors to detect if the device is receiving power at the battery of the device from the charger. In some situations, a device may not receive power from a charger if the device is not properly placed on the charging device. As discussed above, a device may be configured with one or more systems to provide alerts to a user that may inform the user that the device is properly or not properly receiving a charge. For example, a device platform operating the device may be configured to produce a beep or another type of sound alert in response to the device platform determining that the device is properly receiving the charge from the device. Similarly, the device may be configured to provide other alerts, such as visual cues or vibrations. In some implementations, the device may utilize a combination of alerts. Further, the device platform may use different variations of audible alerts to inform the user the status of the device.

Some charging devices may vary in the amount of precision required for the placement of the device to receive charge. For example, a device may be configured with one useable alert signal that may be used for presence detection if the device is receiving power from a wireless charging device. The device may store information relative to the charging session of receiving charge.

A device may be configured to cease receiving power in response to the battery of the device being nearly or completely full or if the battery becomes too hot, for example. The device platform may track the battery level and may be configured to alert the user of the level of the battery.

In some examples, the device platform may communicate with the charging device through various means, including Bluetooth, NFC, or Qi wireless charging control signals. The device platform may determine if the device is properly receiving charge through communication. Further, the device platform may use a combination of sensors and/or communication with the device.

Referring back to FIG. 2, at block 206, the method 200 additionally includes determining whether an orientation of the mobile electronic device relative to the charging surface has changed since the mobile electronic device began receiving the charge during the first session. The device platform may be configured to make a determination whether the device has moved or if the orientation of the device relative to the charging surface has changed. In some examples, the device platform may be configured to make the determination based on the position of the device relative to the charging surface. In some variations, the device platform may determine if the orientation of the device relative to the charging surface has changed since the device began receiving the charge during the first session or some subsequent session (e.g., a second session). The device platform may use information from sensors, gravity vectors, accelerometers, gyroscopes, magnetometer sensors, or other information to determine if the device has moved.

Figure 3C:
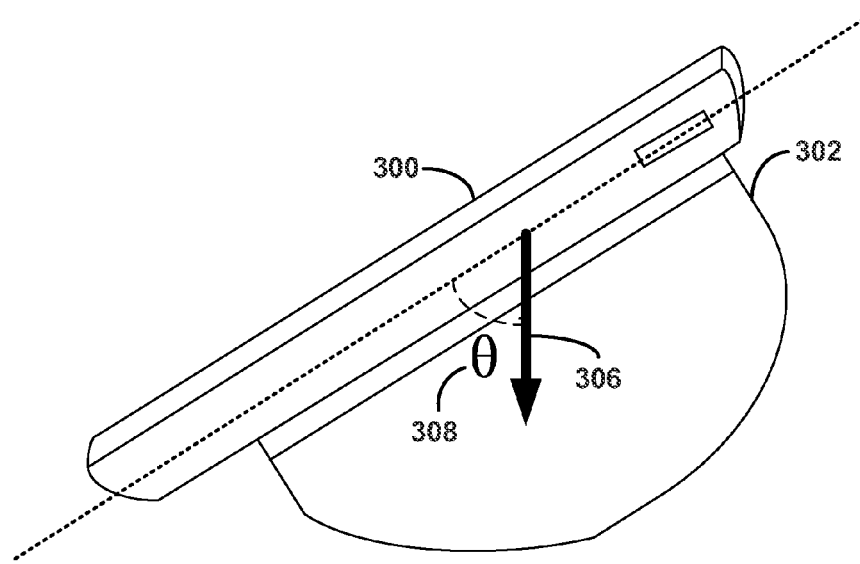
Figure 3D:
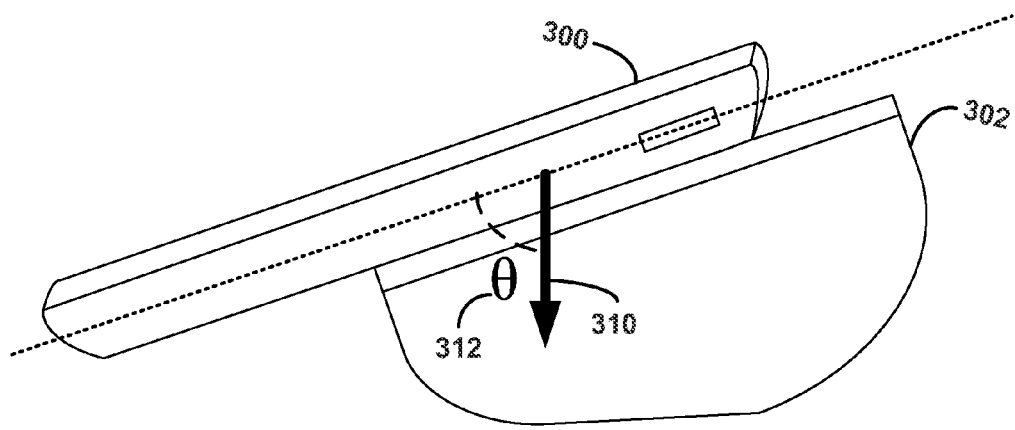

FIGS. 3C-3D illustrate one example implementation of a device platform operating a device, such as a mobile electronic device, and making a determination whether the orientation of the device relative to the charging surface has moved. In the example illustrated by FIGS. 3C-3D, the device platform is shown using gravity vectors to compare the orientation and/or position of the device to determine whether or not the device has moved. The device platform may be configured to determine a gravity vector of the device at various sample points using one or more entities, such as accelerometers, magnetometers, pedometers, or gyroscopes.

FIG. 3C illustrates the device 300 (e.g., mobile electronic device) coupled to and/or in communication with charging device 302. In addition, the FIG. 3C also includes an arrow 306, which may symbolically represent a sampled gravity vector. The sample gravity vector may be sampled during the initial reception of charging at device 300 from charging device 302. Other gravity vector samples may be captured by the device platform as well. The arrow 306 symbolically representing a sampled gravity vector is captured at angle 308 relative to the charging surface. In addition, the device platform may be configured to capture multiple gravity vectors and perform comparisons. Similarly, the device platform may track movement through one or more sensors in order to determine whether the device should provide notifications to the user.

FIG. 3D illustrates the same device 300 (e.g., mobile electronic device) in communication with the same charging device 302 in a different position. In FIG. 3D, the device 300 is slid lower along the charging surface of the charging device 302 causing a less portion of the device 300 to be in connection with the charging surface 302. FIG. 3D includes an arrow 310 similar to arrow 310, which is captured at an angle 312 relative to the charging surface. The device platform operating the device 300 may be configured to compare the gravity vectors represented by arrow 306 and arrow 310 to determine if the orientation of the device 300 has changed relative to the charging surface 302 or if the device has been moved by a user in another manner. Further, the device 300 is physically resting at different positions in FIGS. 3C-3D illustrating that the device 300 has been moved. As a result of detecting the movement or change in orientation, the device platform may or may not provide feedback through one or more systems of the device 300. For example, the device 300 may complete charging at angle 308 shown in FIG. 3C and then may be picked up, used, and placed back on the charging device 302 at angle 312 shown in FIG. 3D. Thus, the device 300 may be receiving charge from charging 312 during different sessions in FIGS. 3C-3D. The first session may be represented by the initial charge in FIG. 3C. The second session, which is subsequent to the first session, may be illustrated by FIG. 3D. Similarly, the different sessions may occur in different orders in other examples. The device platform may determine if the device receives charge during different sessions and may also make a determination that the device 300 has been physically moved and alert the user that the device 300 is receiving charge from the charging device 302.

The device platform may perform a dot product comparison between the various sampled gravity vectors to determine that the device 300 has changed orientation relative to the charging device 302. Moreover, the device platform may determine that the device 300 has moved since receiving the charge in the example shown in FIG. 3C by using one or more types of sensors. FIGS. 3C-3D may be examples occurring in a sequential order or may be disconnected examples. Further, the examples illustrated may include different types of devices and/or a different type of charging device. The device 300 may be positioned at different angles while resting on the charging device 302.

In some implementations, the device platform may determine the gravity vector of the device during the initial reception of power from a charging device and determine an additional gravity vector of the device during or at completion of the reception of charge at the device. The device platform may be configured to compare the gravity vectors by calculating a dot product in order to determine any difference between sampled positions. The device platform may recognize that the device has moved or changed orientation depending if the gravity vectors differ. In some examples, the device platform may analyze the magnitude of one or more gravity vectors to determine if the measured external acceleration has increased during a predefined duration. The gravity vector may accelerate in the case that a user picked up the device. Similarly, the device may be configured to compare a gravity vector of an initial charge during a first session with a gravity vector found in the case the device stops receiving charge and starts to receive charge again. At a minimum, the device platform may be capable of determining if the device moved prior to starting to receive charge again or if the battery of the device drained slightly and started receiving charge again without being moved by a user.

In some implementations, a device platform operating a device may be configured to determine whether the device is at rest when the initially charging begins. For example, the device platform may be configured to sample the direction of the gravity vector for a short period of time when the wireless charging initially starts. The device platform may sample the direction of the gravity vector for about 500 milliseconds or may sample the direction of the gravity vector multiple times (e.g., 3 times). The device platform may store the gravity vector in memory for comparison reasons. Additional gravity vector samples may be determined by the device platform as the charging process continues.

The device platform may be configured to set a flag or another type of signal if no movement is detected over the whole sampling interval. The device platform may set the flag to indicate that the device is at rest. In the case that the device platform detects a change in the directions of gravity vectors or other types of movement, the device platform may clear the flag to indicate that the device is not at rest. The device platform may determine the gravity vector direction at the point that charging ends, or approximately around that point of the charging point. Each sampled gravity vector may be compared to the other gravity vector samples to determine if the device has moved in any way. In some examples, the device platform may keep the rest flag set if no movement is detected and the device platform may also keep at least one gravity vector stored. The device platform may be configured to reset the flag and remove the gravity vectors if movement has been detected. The device platform may use other measurement processes to determine if the device as moved or changed orientation relative to the charging surface.

Referring back to FIG. 2, at block 208, the method 200 includes based on whether the mobile electronic device is receiving the charge during a second session subsequent to the first session and whether the orientation of the mobile electronic device relative to the charging surface has changed since the mobile electronic device began receiving the charge during the first session, providing feedback through one or more systems of the mobile electronic device. As discussed above, the device platform may be configured to provide some type of feedback through one or more systems of the device. The type of feedback provided may vary depending on the circumstances and prior determinations made by the platform of the device.

For instance, a device platform operating a device may be configured to keep a device in a state of rest if the device platform detects that the device is still docked on a wireless charging device even if the battery of the device measures to be mostly full. A device operating in a state of rest may be configured to receive power from the charging without notifying the user that the device is properly receiving charge through sound alerts or other notifications. Similarly, the device in a rest state may be configured to disallow all forms of alerts to a user. For example, the device platform may determine that the battery simply started receiving a charge again after the battery drained slightly over the course of a period of time without a user moving the device from the wireless charging surface.

In the implementations that the device platform utilizes a rest flag, the device platform may determine if movement occurred and whether or not the device should be woken from the rest state. The rest state flag may still be apparent in situations that the battery of the device filled up or became too hot, and thus not movement would have removed the flag.

In one example, the device platform may determine that the orientation of the device relative to the charging surface has changed since the device began receiving the charge during the first session and determine that the device is now receiving the charge during a second session subsequent to the first session. Based on the change in orientation and the device is receiving the charge during the second session subsequent to the first session, the device platform may provide feedback through one or more systems of the device.

In another example, the device platform may determine that the orientation of the device relative to the charging surface has not changed since the device began receiving the charge during the first session and determine that the device is receiving the charge during a second session subsequent to the first session. Based on the lack of change in orientation and the device is receiving the charge during the second session subsequent to the first session, the device platform may not provide feedback through one or more systems of the device.

Further, in yet another example, the device platform may determine that the orientation of the device relative to the charging surface has changed since the device began receiving the charge during the first session and determine that the device is receiving the charge during the first session. Based on the change in orientation and the device is receiving the charge during the first session, the device platform may or may not provide feedback through one or more systems of the device.

In another example, the device platform may determine that the orientation of the device relative to the charging surface has not changed since the device began receiving the charge during the first session and determine that the device is receiving the charge during the first session. Based on the lack of change in orientation and the device is receiving the charge during the first session, the device platform may or may not provide feedback through one or more systems of the device.

In some implementations of performing method 200, the device may be configured to determine to provide feedback as a result of determining that the device has changed orientation or has been moved by a user relative to the charging surface. A change in orientation may result from a user repositioning the device and thus, the device may be configured to alert the user that the device is once again properly receiving charge from a charging device. The device may be configured to provide an alert after determining that the device has been moved prior to starting to receive charge in order to alert the user that the device was properly placed on the charging surface of the charging device. In some instances, the device platform may be configured to determine if the angle of the device relative to the charging device or relative to the ground has changed. The device platform providing feedback may perform one or more of an audible alert, a vibration, or a visual alert. Other examples may exist as well.

A device platform may be configured to not wake a device from a rest state if the current battery level of the device is at or above a threshold level, such as 95 percent full, for example. By not immediately playing feedback upon the initial reception of power from a charging device, a device may suppress the number of false-positive docking signals that may occur as a result of the battery draining and recharging without intervention from a user moving the device off the charging surface.

In an additional example implementation of method 200, a device platform controlling a device may be configured to determine whether a device was recently moved prior to receiving charge through communicating with the charging device. The charging device and device may be configured to communicate using presence detection, such as Bluetooth, NFC, or Qi wireless charging control signals, for example.

In one example implementation of method 200, a device platform controlling a device may be configured to not wake the device when the device stops receiving a charging device. In some instances, the device may be configured to track significant movement, which may require the device to be picked up by a user prior to the device platform waking the device from a state of rest. A device may be in a state of rest during the reception of charge to prevent making additional alerts that may be excessive or unwanted.

In some implementations, a device platform may use an accelerometer, magnetometer, gyroscope, pedometer or other sensors to detect movement of the device. The device may use the various sensors in addition to or replacement of sampling gravity vectors.

A device platform may utilize one or more sensors that may use lower-levels of power to detect any variation of orientation of the device or movement. A device may also use a pedometer to determine movement as well.

In one example, a device platform may continuously monitor the device throughout charging for any type of movement or monitor the device constantly for any type of movement. Similarly, the device platform may be configured to monitor the device periodically for movement.

In another implementation, a device platform may be configured to determine that a device is in wireless communication and/or operatively connected to a charging surface using information from a sensor. The device may receive a charge from the charging surface. The device may receive the charge at a battery coupled to the device. The device platform may further make one or more determinations during the reception of charge. For example, the device platform may determine that the device is receiving the charge in a state of rest for at least a threshold duration of time. The threshold duration of time may be about 500 milliseconds, for example. Based on the determination, the device platform may determine a first position of the device relative to the charging surface. The device platform may use various means to determine the first position of the device relative to the charging surface.

Additionally, the device platform may be configured to further determine that the device ceased receiving charge from the charging surface. Based on the determining if the device has ceased receiving charge, the device platform may determine a second position of the device relative to the charging surface. The device platform may determine the second position in a similar manner as the first position or may use other techniques or measurements.

The device platform may be configured to compare the second position and the first position of the device depending on the charging sessions or other information. Further, the device platform may determine if the device starts to receive charge again. Upon determining that the reception of charge has continued, the device platform may compare the position of the device to previous positions of the charge. Depending if the device platform determines that the device has moved during the period between the first round of charging and the second round of charging, the device platform may provide instructions to the device to change from the rest state to a non-rest state. During the non-rest state, the device platform may provide feedback to the user through various systems associated with the device. The device may produce sounds to alert the user that the new initial charge is the result of the device being displaced and starting to charge again rather than the battery drained slightly while remaining in the same position on the charging surface and the device has started to charge again.

III. Example Illustrations

Figure 4A:
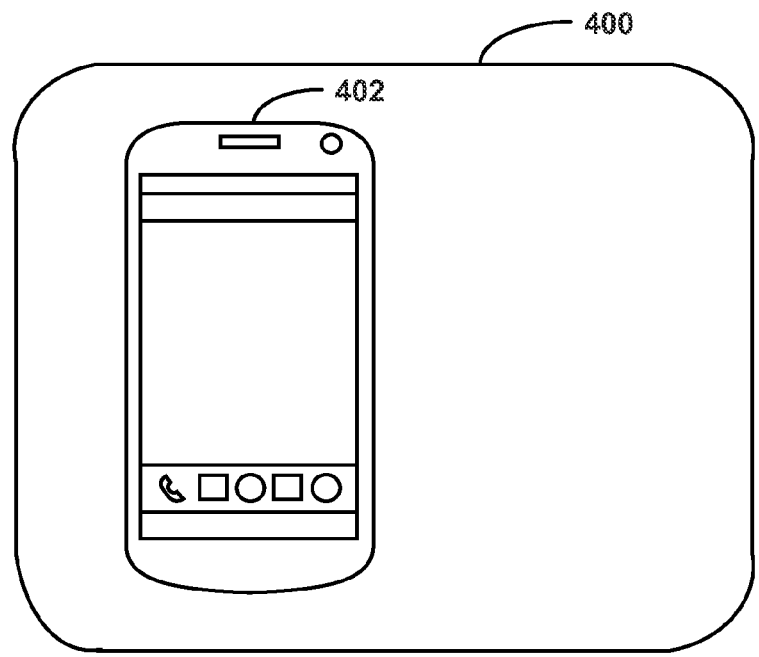
FIGS. 4A-4B illustrate another example implementation using a wireless charging dock identification using sensors.
Figure 4B:
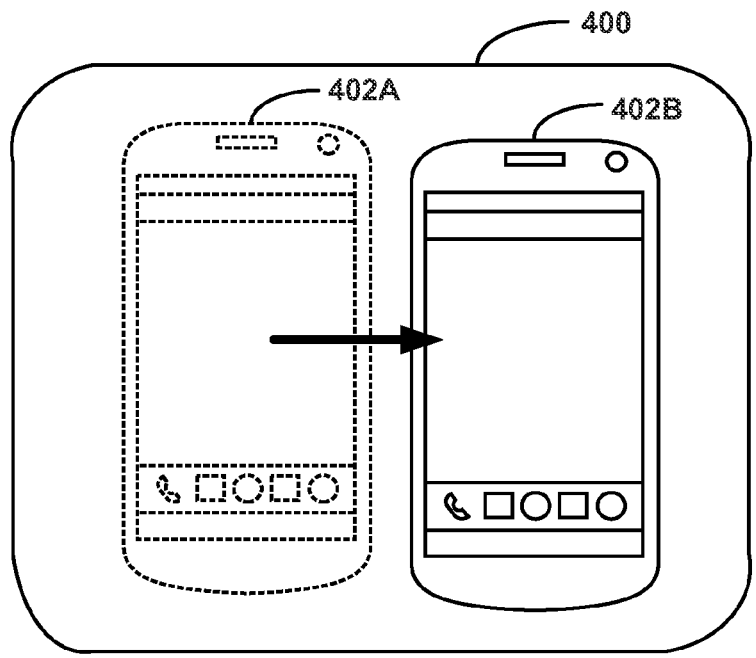

FIGS. 4A-4B illustrate another example implementation of wireless charging dock identification using sensors. Within the Figures, a charging device 400 is illustrated providing a charge to device 402.

FIG. 4A depicts the charging device 400 as a flat planar surface that is larger than the device 402. In the example illustration, the charging device 400 is capable of providing charge to multiple devices. As discussed above, the charging device 400 may be configured to charge one or more devices using inductive charging. Similarly, the charging device 400 may use an electromagnetic field to transfer energy to the device 402.

The charging device 400 may be structured differently in other examples. For example, the charging device 400 may be a different shape or size. The charging device 400 may also be configured as multiple entities connected to provide a charge to the device 402. The charging device 400 may be associated with other devices within a network. In addition, the charging device 400 may receive power from a wall outlet, a generator, or another source. In some examples, the charging device 400 may generate power through solar cells or other means.

FIG. 4A depicts device 402 placed on the charging surface of charging device 400. The device 402 may be in a rest state receiving charge or may be in a non-rest state not receiving charge. Similarly, the device may have just started receiving charge from device 400 and alerted the user that the device is properly receiving charge via a sound alert or another viable option. The device 402 may be a mobile electronic device, computing entity, or other device, for example.

Upon being placed on the charging surface of the charging device 400, the device platform operating the device 402 may be configured to determine if the device is properly receiving charge from the charging device 400. In some instances, the device platform may be configured to perform a notification that alerts the user that the device 402 is properly receiving charge. For example, the device platform may perform an audible alert through a speaker of the device 402. Furthermore, in other instances, the device platform may be configured to perform a notification that alerts the user that the device 402 is not properly receiving charge. Similarly, the device platform may have different types of notifications to alert the user whether or not the device is receiving charge. The device platform may be configured to monitor the level of charge within the battery of the device 402.

In one implementation, the device platform may be configured to adjust the device 402 into a state of rest upon sensing that the battery is receiving charge wirelessly. The device platform may supply an initial notification to the user that the device is properly receiving charge and then adjust the device to a state of rest. During the state of rest, the device platform may refrain from producing any audible sounds or may be configured to not provide any types of notifications. Furthermore, the device platform may turn the device off during the state of rest.

FIG. 4B depicts the same charging device 400 and further depicts device position 402A and device position 402B. FIG. 4B illustrates a scenario that may occur after the example illustrated in FIG. 4A. For example, the device 402 may have completed receiving charge from charging device 400 in the device position 402A. The device 402 may be moved by a user. The device 402 may be placed again on the charging device 400 at device position 402B. The device platform operating the device 402 may be configured to wake the device upon determining that the device 402 has completed receiving charge from the charging device 400. Similarly, the device platform may wake the device 402 upon determining that the device has been picked up by a user. The device platform may also be configured to refrain from producing audible sounds in the case that it has determined that the device has not changed orientation and/or been moved despite starting to receive charge again. The device platform may determine if the device is receiving a charge during a first, second, or another subsequent session.

In some implementations, the device platform may be configured to provide feedback through one of the systems upon determining that the device 402 has been placed on the charging device 400 at device position 402B. The device platform may use gravity vectors or other measurement tools to determine that the device 402 has changed orientation relative to the charging device 400. The device platform may compare a gravity vector stored while the device was charging in device position 402A with a gravity vector determined when the device 402 was in device position 402B. The device platform may use other tools to determine that the device has moved and provide feedback to notify if the device is properly receiving charge at the new position. Other examples of providing feedback may exist as well.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
   determining that a mobile electronic device is in wireless communication with a charging surface;
   determining that the mobile electronic device is receiving a first charge during a first session via the charging surface, wherein the first session is completed when the mobile electronic device stops receiving the first charge;
   determining that the mobile electronic device is receiving a second charge during a second session subsequent to the first session via the charging surface, wherein the mobile electronic device starts receiving the second charge in response to using at least a portion of the first charge received during the first session;
   based on determining that the mobile electronic device is receiving the second charge, determining, during the second session, whether an orientation of the mobile electronic device relative to the charging surface has changed since the mobile electronic device began receiving the first charge during the first session, wherein determining whether the orientation of the mobile electronic device relative to the charging surface has changed includes determining whether the mobile electronic device was uncoupled from the charging surface after receiving the first charge; and
   based on determining, during the second session, that the orientation of the mobile electronic device relative to the charging surface has remained unchanged since the mobile electronic device began receiving the first charge during the first session, causing one or more systems of the mobile electronic device to delay providing feedback until detecting a change in the orientation of the mobile electronic device.

2. The method of claim 1, wherein:
   determining whether an orientation of the mobile electronic device relative to the charging surface has changed since the mobile electronic device began receiving the first charge during the first session includes determining that the orientation has changed; and
   wherein the method of claim 1 further comprises:
   based on the mobile electronic device receiving the second charge during the second session subsequent to the first session and determining that the orientation of the mobile electronic device has changed since the mobile electronic device began receiving the first charge during the first session, providing feedback through one or more systems of the mobile electronic device.

3. The method of claim 1, wherein determining that the mobile electronic device is receiving the first charge comprises determining that the mobile electronic device is receiving the first charge wirelessly at the mobile electronic device.

4. The method of claim 1, wherein determining whether the orientation of the mobile electronic device relative to the charging surface has changed since the mobile electronic device began receiving the first charge during the first session comprises:
  determining a plurality of gravity vectors based on the orientation of the mobile electronic device, wherein at least one gravity vector of the plurality of gravity vectors is determined when the mobile electronic device starts receiving the first charge during the first session and at least one gravity vector of the plurality of gravity vectors is determined when the mobile electronic device is receiving the second charge during the second session subsequent to the first session; and
  performing a comparison of plurality of gravity vectors to determine whether the orientation of the mobile electronic device has changed.

5. The method of claim 1, wherein determining whether the orientation of the mobile electronic device relative to the charging surface has changed comprises using outputs from an accelerometer, a gyroscope or a magnetometer sensor.

6. The method of claim 1, wherein providing feedback comprises performing one or more of an audible alert, a vibration, or a visual alert.

7. A computing device comprising:
  at least one processor; and
  a memory having stored thereon instructions that, upon execution by the at least one processor, cause the computing device to perform functions comprising:
    determining that the computing device is in wireless communication with a charging surface;
    determining that the computing device is receiving a first charge during a first session via the charging surface, wherein the first session is completed when the computing device stops receiving the first charge;
    determining that the computing device is receiving a second charge during a second session subsequent to the first session via the charging surface, wherein the computing device starts receiving the second charge in response to using at least a portion of the first charge received during the first session;
    based on determining that the computing device is receiving the second charge, determining, during the second session, whether an orientation of the computing device relative to the charging surface has changed since the computing device began receiving the first charge during the first session, wherein determining whether the orientation of the computing device relative to the charging surface has changed includes determining whether the computing device was uncoupled from the charging surface after receiving the first charge; and
    based on determining, during the second session, that the orientation of the computing device relative to the charging surface has remained unchanged since the computing device began receiving the first charge during the first session, causing one or more systems of the computing device to delay providing feedback until detecting a change in the orientation of the computing device.

8. The computing device of claim 7, wherein:
  determining whether an orientation of the computing device relative to the charging surface has changed since the computing device began receiving the first charge during the first session includes determining that the orientation has changed; and
  wherein the functions further comprise:
    based on the computing device receiving the second charge during the second session subsequent to the first session and determining that the orientation of the computing device has changed since the computing device began receiving the first charge during the first session, providing feedback through one or more systems of the computing device.

9. The computing device of claim 7, wherein:
  determining whether an orientation of the computing device relative to the charging surface has changed since the computing device began receiving the first charge during the first session includes determining that the orientation has changed; and
  wherein the functions further comprise:
    based on the computing device receiving the first charge during the first session and determining that the orientation of the computing device has changed since the computing device began receiving the first charge during the first session, providing no feedback.

10. The computing device of claim 7, wherein determining that the computing device is receiving the first charge comprises determining that the computing device is receiving the first charge wirelessly at the computing device.

11. The computing device of claim 7, wherein determining whether the orientation of the computing device relative to the charging surface has changed comprises using outputs from an accelerometer, gyroscope or a magnetometer sensor.

12. The computing device of claim 7, wherein determining whether the orientation of the computing device relative to the charging surface has changed comprises determining a plurality of gravity vectors based on the orientation of the computing device, wherein at least one gravity vector of the plurality of gravity vectors is determined when the computing device starts receiving the first charge and at least one gravity vector of the plurality of gravity vectors is determined when the computing device starts to receive another charge; and
  performing a comparison of plurality of gravity vectors to determine whether the orientation of the computing device has changed.

13. A computer readable medium having stored thereon instructions that, upon execution by a computing device, cause the computing device to perform functions comprising:
  determining that the computing device is in wireless communication with a charging surface;
  determining that the computing device is receiving a first charge during a first session via the charging surface, wherein the first session is completed when the computing device stops receiving the first charge;
  determining that the computing device is receiving a second charge during a second session subsequent to the first session via the charging surface, wherein the computing device starts receiving the second charge in response to using at least a portion of the first charge received during the first session;
  based on determining that the computing device is receiving the second charge, determining, during the second session, whether an orientation of the computing device relative to the charging surface has changed since the computing device began receiving the first charge during the first session, wherein determining whether the orientation of the computing device relative to the charging surface has changed includes determining whether the computing device was uncoupled from the charging surface after receiving the first charge; and based on determining, during the second session, that the orientation of the computing device relative to the charging surface has remained unchanged since the computing device began receiving the first charge during the first session, causing one or more systems of the computing device to delay providing feedback until detecting a change in the orientation of the computing device.

14. The computer readable medium of claim 13, wherein:
determining whether an orientation of the computing device relative to the charging surface has changed since the computing device began receiving the first charge during the first session includes determining that the orientation has changed; and
wherein the functions further comprise:
based on the computing device receiving the second charge during the second session subsequent to the first session and determining that the orientation of the computing device has changed since the computing device began receiving the first charge during the first session, providing feedback through one or more systems of the computing device.

15. The computer readable medium of claim 11, wherein the function of providing feedback comprises performing one or more of an audible alert, a vibration, or a visual alert.

16. The method of claim 1, further comprising:
detecting a given change in the orientation of the mobile electronic device relative to the charging surface; and
based on detecting the given change in the orientation of the mobile electronic device relative to the charging surface, providing feedback through the one or more systems of the mobile electronic device.

* * * * *